May 7, 1963  A. SLESACZEK  3,088,722
WALL CONSTRUCTION AND MOUNTING THEREOF
FOR INDUSTRIAL FURNACES
Filed Aug. 31, 1960  5 Sheets-Sheet 1
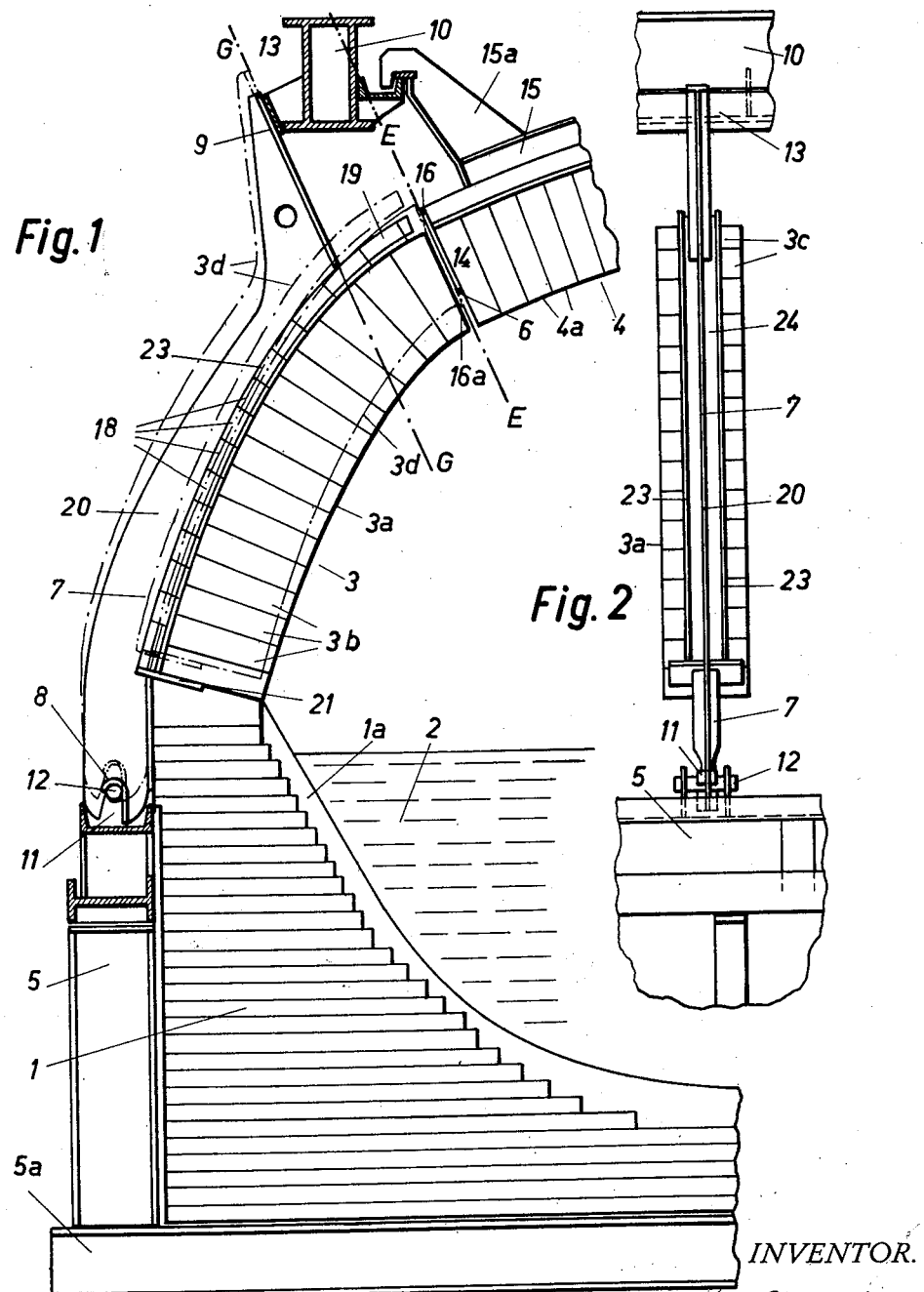
INVENTOR.
Alfred Slesaczek
BY Werner W. Kleeman
ATTORNEY

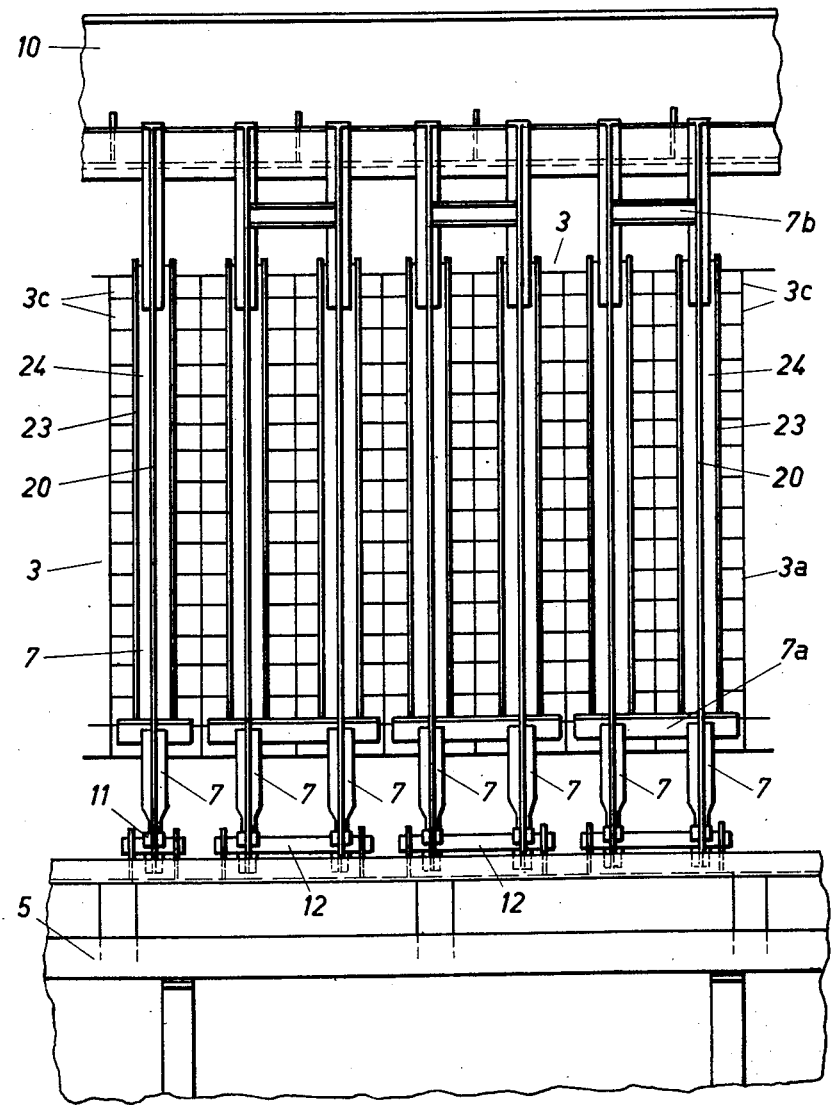

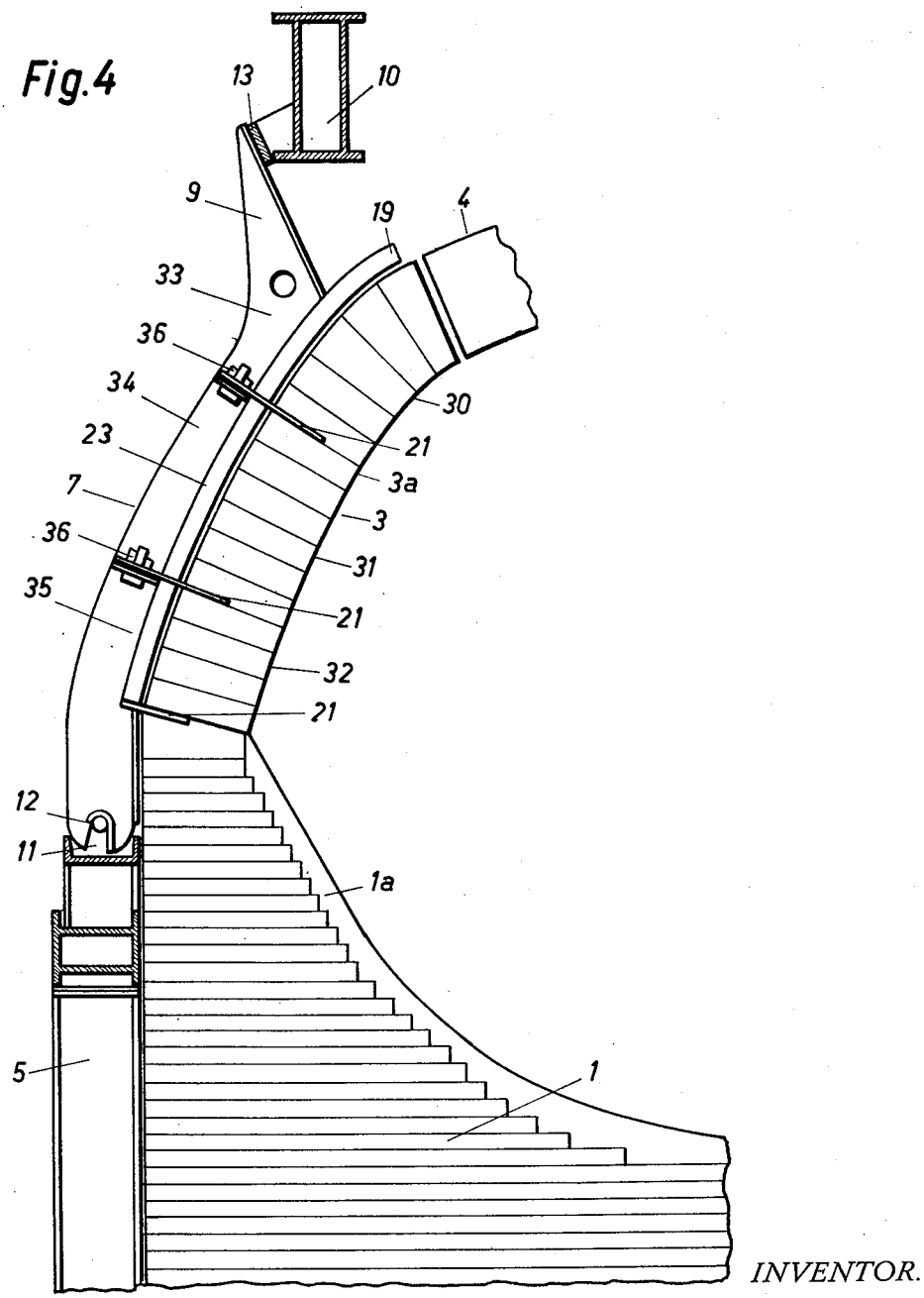

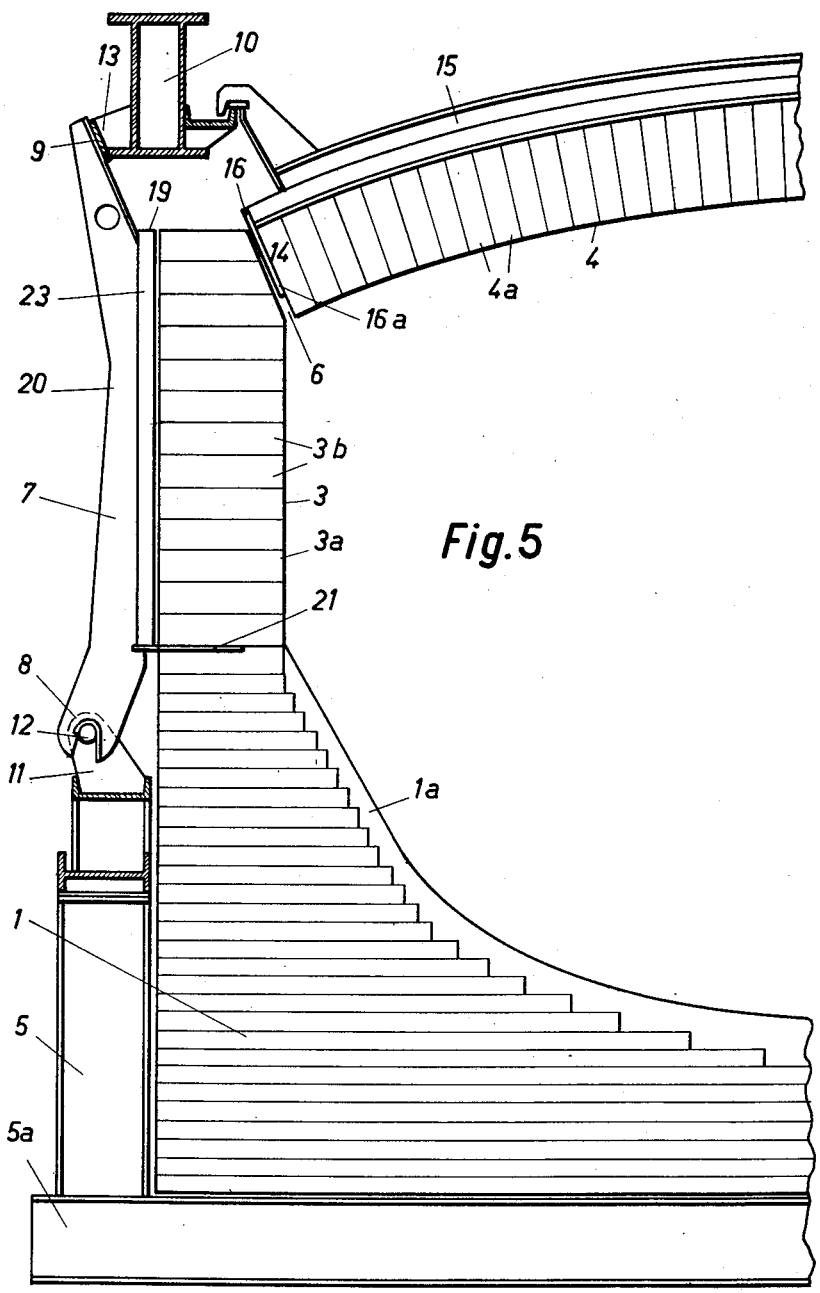

May 7, 1963
A. SLESACZEK
3,088,722
WALL CONSTRUCTION AND MOUNTING THEREOF
FOR INDUSTRIAL FURNACES
Filed Aug. 31, 1960
5 Sheets-Sheet 5
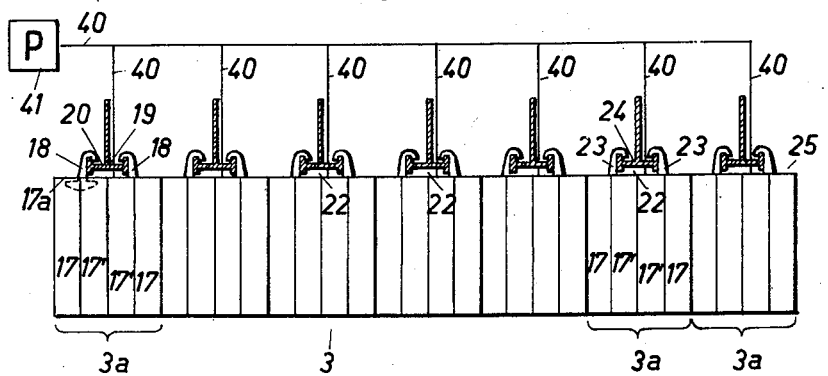
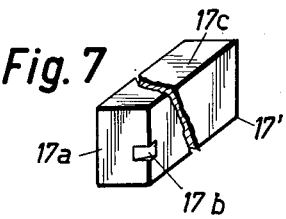
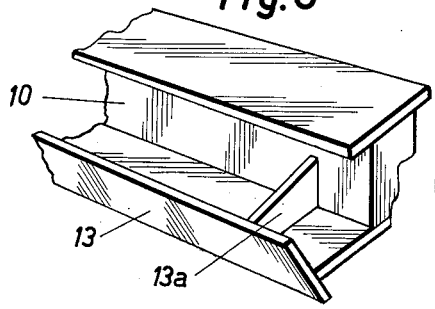
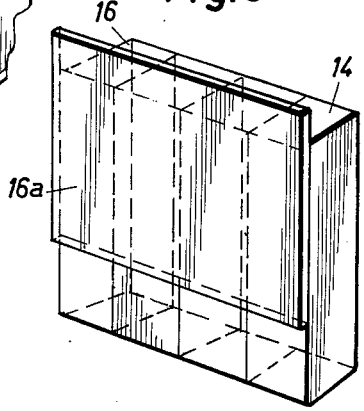
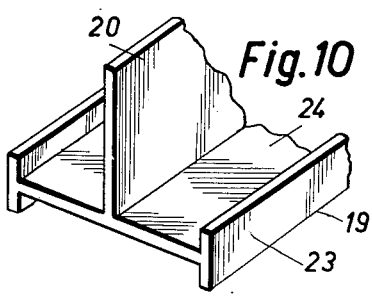
INVENTOR.
Alfred Slesaczek
BY Werner W. Kleeman
ATTORNEY United States Patent Office 3,088,722
Patented May 7, 1963

3,088,722
WALL CONSTRUCTION AND MOUNTING THEREOF FOR INDUSTRIAL FURNACES
Alfred Slesaczek, Kusnacht, Zurich, Switzerland, assignor to Maerz Ofenbau AG., Zurich, Switzerland, a corporation of Switzerland
Filed Aug. 31, 1960, Ser. No. 53,143
Claims priority, application Austria Sept. 3, 1959
14 Claims. (Cl. 263—46)

The present invention relates to a novel wall construction and mounting in an industrial furnace and the like, particularly suitable for adaptation in a Siemens-Martin type furnace.

It is well known that generally the refractory brickwork of industrial furnaces expands during heating. Additionally, expansion of the refractory blocks may occur due to metallic or oxidic infiltrations. For example, the hearth brickwork of copper melting furnaces continuously expands during operation because the magnesite blocks of the hearth gradually increase in volume due to the absorption of copper. In a Siemens-Martin type furnace, by way of illustration, the absorption of ferric oxide from the atmosphere in the furnace causes a gradual increase in the volume of the basic blocks of the furnace. Certain of the blocks, for example, magnesite blocks are able to gradually undergo shrinkage when kept at a high temperature for a considerable length of time thereby resulting in a contraction of the furnace brickwork. Consequently, it is possible that the furnace refractory brickwork may expand and/or contract under the influence of varying thermal conditions occuring during operation of the furnace.

The increase in the volume of the individual refractory blocks of the furnace during heating or under the general effects of furnace operation is oftentimes accommodated for by providing expansion joints. If an expansion joint or gap is provided after each block which is adequate to take up expansion of the refractory brickwork, said brickwork will retain its original position. Frequently, however, the arrangement and distribution of a number of such expansion joints is not possible and many times it is only possible to provide an expansion joint after a certain considerable length of refractory brickwork. By way of example, it is not possible to provide expansion joints to allow for expansion of the refractory blocks in the hearth of a melting furnace accommodating a liquid metal bath since the molten metal would tend to flow out through such expansion joints or gaps which are not completely sealed.

When the refractory blocks expand, the hearth brickwork will rise or be displaced and the furnace walls supported on the hearth brickwork will be raised to the same extent. The furnace walls tend to move in the direction of an expansion joint or gap previously provided and which may be arranged, by way of example, between the furnace wall and the dome or arch of the furnace. Generally the reinforcement of the furnaces is rigidly constructed and does not partake or follow the movement of the furnace brickwork. Consequently, when the furnaces are heated or when the individual refractory blocks subsequently expand or when subsequent contraction or shrinkage of said blocks takes place, a relative movement between the stationary reinforcement and the refractory brickwork will occur. In those furnace constructions wherein the refractory walls thereof loosely rest on the reinforcement member such relative movement does not have any detrimental effect on the furnace. However, such relative movement of reinforcement member and furnace wall becomes very damaging if the brickwork of the furnace wall is secured to the reinforcement member. Furthermore, it is immaterial whether all the separate blocks of the furnace wall or only a portion thereof are attached to the reinforcement member. The refractory blocks attached to or suspended from the reinforcement member will resist such relative movement. As a consequence thereof, the brickwork of the wall may be dangerously loosened or additional stresses will be built up adversely effecting the life of the furnace wall.

In certain furnace constructions it is possible to provide horizontal expansion joints to take up the rise or movement of the furnace wall which are arranged between said wall and its adjacent furnace dome or arch. Such expansion joints or gaps can be sufficiently dimensioned since the sealing thereof is comparatively simple. If, however, the wall of the furnace adjoins the dome or arch along an inclined surface the formation and sealing of the expansion joints becomes extremely difficult. The elastic sealing of an inclined expansion joint without resulting in detrimental effects on its durability is a problem not heretofore solved when the temperatures of the furnace wall are comparatively high. If the expansion joint is sufficiently dimensioned and constructed to allow for all degrees or possibilities of rising of the furnace wall, the expansion joint may, at least temporarily, remain open and be the cause of premature wear and tear at this point. On the other hand, if the expansion joint is too narrowly constructed the furnace dome may be lifted when the furnace wall rises. In such an instance the refractory wall of the furnace will be additionally stressed and prematurely destroyed. If the dome of the furnace is not arranged so as to be movable, the pressure resulting from the expansion of the individual refractory blocks causes both the furnace wall and its dome member to be destroyed. Unclosed or badly sealed expansion joints may further cause air to be drawn into the furnace or flames to emerge therefrom, depending of course on the pressure conditions present in the furnace interior. Both such results are extremely undesirable and detrimental to proper functioning of the furnace and the life of service thereof.

The present invention contemplates a novel furnace wall construction and arrangement wherein the reinforcement wall to which the individual blocks of the furnace are attached is adapted to follow the movements of the brickwork of the furnace wall without resistance. The reinforcement system for the wall of the furnace is thus not rigidly attached to the reinforcement system for the base of the furnace, but rather, is movably associated therewith. In a vertical or inwardly inclined furnace wall arrangement, the movable reinforcement member for the furnace wall is so arranged that the center of gravity of the movable furnace wall and its associated reinforcement member is located between the support for the reinforcement member and the interior of the furnace so that the furnace wall with its associated reinforcement member will adjoin the reinforcement system for the base of the furnace under its own weight. The reinforcement means for the wall of the furnace is provided at its lower end with a bifurcated or forked construction and prevents the furnace wall from being forced outward at its lower end, said bifurcated end being pivotally arranged on horizontal support members. Such an arrangement of the reinforcement system for the wall of the furnace enables the refractory brickwork and the associated reinforcement member to be raised while at the same time preventing movements transverse to the wall of the furnace. The reinforcement member, however, is readily shiftable under the influence of the furnace wall if the latter is lifted due to expansion of the hearth brickwork. The reinforcement member may also be pivoted outwardly about its support so that the wall of the furnace may be correspondingly raised.

The movable reinforcement means may be slidably arranged at its upper end and disposed in abutting relation to an upper support member. It is advantageous to provide the upper support member with a contact surface member which is parallel to the expansion joint or gap provided between the furnace wall and the adjacently disposed dome member. Thus, when the furnace wall rises, the one end of said furnace wall adjacent the dome will be displaced in such a manner that the gap or expansion joint between the furnace wall and the dome member remains unchanged. At the same time the reinforcement member is slightly pivoted about its lower support. If the furnace wall is lowered in view of subsequent shrinkage of the individual blocks of the hearth brickwork an opposite movement occurs, and similarly, the separation or expansion joint between furnace wall and dome member again remains unchanged during this movement. The aforementioned arrangement and design prevents the furnace wall from abutting against the dome when it rises, and as a result, neither the individual blocks of the furnace wall nor the blocks of the dome member will be damaged. The furnace wall construction according to the present invention and provided with the movable reinforcement system can advantageously be subdivided into several strips or separate wall sections. Of particular advantage is a subdivision of the furnace wall and its associated reinforcement members into vertically arranged parallel planes, wherein the entire furnace wall will be formed of individual, mutually adjacent and adjoining wall sections or strips. Each of these furnace wall sections is provided with an associated reinforcement member, reinforcement of the individual wall sections being independent of one another, or adapted to be connected into respective groups of individual wall sections capable of functioning independently of one another. It is also further possible to subdivide the furnace wall into a series of overlying strips or banks of refractory blocks arranged in vertical or horizontal adjacent portions, said banks of refractory blocks being subdivided into vertical boundary planes with respect to their height while the associated overlying reinforcement members for the bank of block members are detachably interconnected. The subdivision of the furnace wall into individual furnace wall sections, in the manner hereinabove described, results in the considerable advantage that the individual wall sections can be worked into finished condition prior to closing of the furnace, and hence, may be installed as finished structural units. Additionally, the furnace wall after operation of the furnace can be dismantled in individual wall sections. The erection and dismantling of a furnace wall constructed from individual sections greatly reduces furnace closing time redounding in a substantial gain in production. Moreover, it is also possible to replace individual wall sections of the furnace which may become damaged or are subjected to greater wear during its operation, and to perform hot repairs in the shortest possible time without requiring heavy manual work.

Accordingly, it is an important object of the present invention to provide means accommodating for thermal effects acting on a furnace wall so as to enable said furnace wall to effectively and safely withstand such thermal effects without decreasing the efficiency of the furnace expansion joints.

It is another object of the present invention to provide a novel arrangement and mounting of a furnace wall and dome member permitting adjustment of the position of said furnace wall when under the influence of thermal effects causing expansion and/or contraction of the refractory brickwork tending to displace the furnace wall.

It is a further object of the present invention to provide a novel arrangement and furnace construction permitting simple and quick assembly and disassembly of the furance as well as relatively easy replacement of portions of the wall of the furnace.

Another object of the present invention is to provide means effectively allowing for movement of a furnace wall in accordance with distortion or displacement of its refractory brickwork due to thermal effects.

Still a further important object of the present invention is the provision of a wall construction, particularly for a substantially vertical or inwardly inclined side wall of a Siemens-Martin type furnace which compensates for thermal effects acting on the brickwork of the furnace by providing a reinforcement system for the furnace wall arranged so as to be movable.

Yet another important object hereof is to provide in combination with a furnace having a movable sidewall and a dome section having juxtaposed end walls forming an expansion joint between the sidewall and the dome section and support means mounted to the sidewall and having a laterally extending guide arm portion at the upper end thereof: means mounting the lower end of the support means for at least pivotal and vertical, and preferably also lateral, movement thereof while the end walls forming the expansion joint are in juxtaposed relation, and guide means having a guide surface disposed at least substantially parallel to the juxtaposed end walls and engaging the guide arm portion of the support means to guide movement of the support means and the sidewall carried thereby at least substantially parallel to the plane of the expansion joint, whereby to accommodate thermal expansions encountered within the furnace without decreasing or destroying the efficiency of the expansion joint and/or whereby to permit movement of the sidewall independent of the dome section while maintaining a defined expansion joint relation therebetween.

These and still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Several embodiments of the wall construction and mounting according to the present invention are represented in the drawings wherein like reference numerals generally denote similar elements.

In the drawings:

FIGURE 1 is a vertical section through one-half of a Siemens-Martin type furnace with a wall construction pursuant to the present invention and in accordance with a preferred embodiment;

FIGURE 2 is an elevational view of a wall section composed of one or more blocks arranged next to one another to form a layer and then stacked in superimposed relation to define the wall construction according to FIGURE 1;

FIGURE 3 illustrates an elevational view of a wall construction employing a plurality of wall sections assembled in groups according to the present invention;

FIGURE 4 is a cross-sectional view of a further embodiment of a wall construction employing banks of refractory blocks arranged in vertical groups and overlying one another;

FIGURE 5 is a cross-sectional view of a furnace wall construction and mounting pursuant to the present invention and employing vertical side walls;

FIGURE 6 is a horizontal sectional view of the furnace wall construction of FIGURE 5 showing details of the suspension system for the blocks;

FIGURE 7 is a perspective view of a block member showing the details of a recess for receiving the suspension members and a covering or jacket for the block;

FIGURE 8 is a perspective, fragmentary view of the support beam for the dome member illustrating the contact member against which the upper end of the reinforcement member for the side wall bears;

FIGURE 9 is a perspective showing of the plate member against which bears the lower blocks of the dome member; and FIGURE 10 is a perspective, fragmentary view, of a reinforcement member including an I-shaped profile and rib portion.

Referring now to the drawings and, more particularly, to FIGURES 1 and 2 thereof, the hearth brickwork 1 is enclosed and supported at its base and lower end by a reinforcement or support member 5 including a base portion 5a. In Siemens-Martin type furnaces the hearth brickwork 1 is preferably formed of magnesite blocks covered by a more or less thick lining 1a formed of a presintered material, as for example, dolomite or magnesite entraining the molten metal bath 2. It is to be understood that for purposes of clarification only enough of the furnace structure has been set forth to provide an understanding of the invention, and while FIGURE 1 discloses a section through one-half of the furnace it is to be recognized that the opposite half of the furnace is of similar construction.

The wall 3 of the furnace may preferably consist of a plurality of individual wall sections 3a consisting of the blocks 3b which are arranged in side by side relationship to form a layer 3c, a plurality of such layers 3c being superimposed in stack formation to form said wall section 3a. The width of each wall section 3a is governed by the number of blocks 3b arranged alongside one another to initially form said layer 3c, whereas the height of the wall section 3a is governed by the number of layers 3c which are employed. By briefly referring to FIGURE 6 it will be seen how the individual layers of each wall section 3a are formed of a plurality of blocks arranged in side by side relationship, which in the illustrated figure are designated by reference numerals 17, 17'. The top of the furnace is enclosed by a dome or arch 4 which may similarly be formed of a number of individual dome sections constructed from individual blocks 4a in a manner similar to the wall sections 3a. The wall sections 3a of the furnace wall 3 are inwardly inclined and are adapted to be removed, as is also possible with the arch 4, to facilitate assembly and disassembly of the furnace unit. The arch or dome member 4 is spaced from the upper end of the furnace wall section 3 to define an expansion joint or gap 6. A furnace wall reinforcement member 7 is provided which is pivotally supported at its lower end 8 on a support member 12 while its upper end 9 serves to define a sliding contact surface 9 bearing against an adjacently arranged contact member 13 carried through the intermediary of supporting plate means 31a by the longitudinally extending support column or beam 10 (see FIGURE 8). The support beam 10 is arranged above the furnace and supports the dome 4 by means of the reinforcement member 15 provided with the support hook 15a. The slidable contact surface 9 of the reinforcement member 7 is arranged substantially parallel to the expansion joint 6.

The reinforcement member 7 consists of the rib portion 20 which is rigidly secured at its lower end to a curved bracket or I-shaped member 19 having web portions 24 and flange portions 23, see FIGURES 2, 6 and 10. The reinforcement member 15 for the dome 4 may be of similar construction. The respective blocks 3b of the furnace wall sections 3a as well as the blocks 4a of the dome 4 are supported by the wall reinforcement member 7 and dome reinforcement member 15, respectively, in a manner more fully described hereinafter with reference to FIGURE 6. The phantom lines 3d of FIGURE 1 schematically illustrate the movement of the furnace wall 3 when the hearth brickwork 1 rises under the influence of thermal effects, as for example, expansion of said brickwork. The lower end 8 of the rib 20 of the wall reinforcement member 7 is provided with a bifurcated or forked portion 11 pivotally arranged on a support shaft 12 carried by the base reinforcement means 5. During movement of the wall of the furnace and the individual wall sections 3a thereof, the bifurcated portion 11 tends to pivot about the support shaft 12 and is adapted to lift off said support shaft, whereas the upper contact surface 9 slides along the adjacent metallic contact member 13 secured, as by welding, to the longitudinal beam 10. The end layer of blocks 14 of the dome 4 is retained in position by means of a plate member 16 (see FIGURES 1 and 9) carried by the dome reinforcement means 15 and is capable of deformation within certain prescribed limits. Thus, if for any reason insufficient movement for expansion is provided for the arch 4, the end layer of blocks 14 of the arch 4 will force the lower free end 16a of the plate 16 outwards in the direction of the wall section 3a whereby the plate 16 is able to slightly pivot said wall section 3a about its lower pivot support member 12 without encountering excessive resistance, so that the upper contact surface 9 of the wall reinforcement member 7 will be slightly lifted or displaced from the contact member 13 carried by the longitudinal beam 10. By briefly inspecting FIGURE 9 the arrangement of the plate member 16 and layer of blocks 14 of the dome section will become more clearly evident.

From the preceding discussion it should be apparent that the movable sidewall 3 and dome member or section 4 have juxtaposed end walls forming the expansion joint 6 therebetween. The reinforcement member 7 serves as a support means mounted to the sidewall and the upper end 9 thereof is a laterally extending guide arm portion or guide member which cooperates with the contact member or guide surface 13. The bifurcated portion 11 at the lower end of the reinforcement member or support means 7 cooperates with the support shaft 12 to provide means mounting the lower end of the support means for at least pivotal and vertical movement thereof while the end walls are in juxtaposition. The bifurcated portion 11 and support shaft 12 are essentially cooperating mounting elements which, as explained more fully below, also permit lateral movement therebetween. The longitudinal beam 10 which carries the contact member 13 essentially serves as a guide means with the contact member 13 thereof defining a guide surface which, as shown in FIGURE 1, is disposed parallel to the plane of the expansion joint 6 between the juxtaposed end walls of the sidewall 3 and dome section 4. The plane of the guide surface of contact member 13 is shown in FIGURE 1 as having an axis G—G parallel to the axis or plane E—E of the expansion joint and end walls forming the same.

As further shown in FIGURE 1 the brickwork 3b of the respective wall sections 3a forming the furnace wall 3, each have their lower end resting on respective supporting plates 21 attached to each respective wall reinforcement member 7. Each supporting plate 21 is arranged perpendicularly with respect to the longitudinal axis of the respective reinforcement member 7 and is required to retain the individual wall sections 3a during shipping, and further to absorb or take up the weight of the individual blocks 3b. It is also apparent that such supporting plates 21 may also be distributed throughout the height of each of the wall sections 3a to divide said wall section 3 into subsections in order to relieve the underlying brickwork from the weight of the structure disposed thereabove, see FIGURE 4. Such supporting plates 21 are deemed absolutely necessary if the furnace wall is divided into horizontally arranged wall sections in order to take up the weight component of the overlying strips or sections of the refractory brickwork. In FIGURE 2 there is clearly shown an individual wall section 3a forming part of the furnace wall 3 wherein each wall section 3a is supported by an individual reinforcement member 7.

While the refractory brickwork of the embodiment shown in FIGURES 1 and 2 is formed of individual wall sections 3a each provided with a separate reinforcement member 7 and operating independently from adjacent wall sections, FIGURE 3 illustrates a further arrangement of the furnace wall 3. In this embodiment a common reinforcement member 7 unites two adjacent wall section units 3a so as to function as a unitary member. The reinforcement member 7 thereof is pivotally supported on a support shaft 12, whereas connection between said adjacent wall sections 3a is achieved by means of the lateral cross members 7a and 7b resting on said support member or bar 12. It is of course to be appreciated that more than two adjacent wall sections 3a could be similarly connected together and supported so as to function as a common unit.

In the embodiment disclosed in FIGURE 4, the individual wall sections 3a are further subdivided into subsections or groups 30, 31 and 32 by means of the supporting plates 21 distributed throughout the height of the wall section 3a. The reinforcement member 7 is formed of the individual detachable sections or plates 33, 34, and 35 secured together by a suitable fastening member, as for example bolts 36, and which also serve to attach the supporting plates 21 to said reinforcement member 7. Each of the detachable sections 33, 34 and 35 of said reinforcement member 7 is provided with a connecting or supporting plate 21 in order to take up some of the weight of the block subsections 30, 31 and 32.

As clearly shown in FIGURE 5, the furnace wall construction 3 may naturally also be applied to furnaces having substantially vertical walls formed of individual wall sections 3a. The construction of the furnace wall 3 corresponds substantially to that previously discussed with reference to FIGURES 1–4. The reinforcement member 7 is provided with a straight I-section 19 and has its upper end or contact surface bearing against the metallic contact member 13 (see also FIGURE 8) carried on the longitudinally extending column 10 under the influence of the weight of the furnace wall section 3a supported by the plate 21 carried by the reinforcement member 7.

In FIGURE 6 there is illustrated the details of the suspension system or mode of securing the blocks 3b and the individual layers 3c to the respective reinforcement members 7. Although FIGURE 6 is a top view or horizontal section taken through the furnace wall of FIGURE 5, it is to be understood that the furnace wall 3 and wall sections 3a thereof may be similarly secured to the respective reinforcement members 7 disclosed hereinabove with reference to FIGURES 1–4. As can best be seen from FIGURE 6, a plurality of adjacently arranged wall sections 3a, are defined by layer of blocks, which as shown each layer is formed of four blocks 17 and 17' and have their cold ends 17a (see FIG. 7) provided with a horizontally extending recess or groove 17b covered by a sheet-metal stirrup (not shown). Suspension hooks or hangers 19 are adapted to be received by said recesses 17b of adjacently arranged blocks 17 and 17', which hooks may in turn be suspended or supported by the bracket or I-shaped profiles 19 of the reinforcing member 7. The rib portion 20 of the respective reinforcement member 7 are connected by welding or the like directly to the center of the web portion 24 of the bracket or I-profile. The individual blocks 4a of the furnace arch or dome 4 are attached to their associated reinforcement member 15 in a similar manner.

The refractory blocks most suited for use as a furnace wall are silica blocks, fire-clay blocks and basic blocks. Particularly suitable for the furnace walls of a Siemens-Martin type furnace are blocks formed of magnesite and chromite and, among those, refractory blocks which are in unbaked conditions and having a sheet-metal jacket 17c and a molded recess 17b into which the suspension hook 18 is adapted to engage. It is also readily possible to directly fasten an eyelet or the like to the jacket 17c to serve as the suspension member.

The disclosed arrangement and design of the furnace wall reinforcement member 7 further renders it possible to cool the furnace wall or sections 3a by relatively simple means. To this end, the I-shaped members 19 to which the individual blocks are attached define a hollow space 22 open towards the outer surface 17a of the furnace wall, said space 22 being substantially bounded by the contour of the bracket or I-shaped profile 19, more specifically by the web portions 24 and flange portions 23. A conduit system 40 serves to supply a pressurized coolant from a supply source 41, which may be a pump or blower unit supplying cooling air, and is endwise connected to said hollow space 22. Advantageously provided between the lateral flanges 23 of the I-profile 19 and the outer surface 17a of the wall sections 3a are lateral passages 25 for the coolant so that the latter can flow out laterally and thus cool the complete outer surface 17a of the furnace wall 3. Such lateral outlets 25 are automatically formed in curved walls since the reinforcement member 7 is arcuate whereas the furnace wall 3 is polygonal owing to the attachment of the individual refractory blocks 3b.

In FIGURE 6 there is clearly shown the hollow spaces 22 through which the coolant flows, and in this figure the coolant flows in direction perpendicular to the plane of the paper. The confines of said hollow space 22 is defined by the outer surface 17a of the refractory blocks 17 and 17' and, further, by the web 24 and flanges 23 of the I-profile 19. Disposed below the flanges 23 are the lateral outlet openings 25 for transverse movement of the cooling medium. The emerging coolant therefore is able to pass over and cool the wall surfaces located between the individual sections of the furnace.

The ribs 20 of the reinforcement member 7 which are preferably welded to the webs 24 perform a dual function. On the one hand said ribs increase the moment of resistance of the I-profile 19 and, on the other hand, they function as so called cooling fins or ribs (see FIGURE 10). Since the I-profiles may tend to rest on the surface of the furnace walls when the walls are substantially worn, they may be heated to an unduly high temperature and become distorted and loose their shape. This would be most undesirable for any subsequently applied wall section supported by the now distorted reinforcement member 7 since a high degree of accuracy in the arrangement and mounting of the reinforcement member is required in the described wall arrangement. The welded ribs 20, however, will prevent undue heating of the I-shaped profiles 19 and thereby ensure preservation of the configuration and shape of the wall reinforcement member 7.

As shown in FIGURES 1–5, the bifurcated portion 11 of the reinforcement member 7 and its upper contact surface 9 are supported by these ribs 20. It is possible to provide separate elements serving as the bifurcated member 11 and contact surface 9 which are connected to the rib portion 20 of the reinforcement member. The I-profiles or supporting sections 19 of the reinforcement member 7 then need not be longer than necessary to attach the individual blocks 3b thereto, and the cooling fin or rib 20 projects downward over a length of I-profile 19 which supports the brickwork of the furnace wall 3, in a manner hereinabove described. A further advantage is obtained by arranging the supports I-profiles 19 on the ribs 20 in that any deformation of the flanges 23 thereof, which may be caused by mechanical damage to the steel work, will not detrimentally effect the entire reinforcement member or unit 7.

The furnace wall construction heretofore described may be formed of the individual blocks 3b, the length of which substantially corresponds to the thickness of the furnace wall 3. As already previously noted, a plurality of the blocks, such as blocks 17, 17' (see FIGURE 6) may be placed alongside one another so as to govern the width of the furnace wall section 3a. It is also possible to combine shorter refractory blocks which mutually support one another and wherein only a portion thereof are directly attached to the reinforcement member. Moreover, it is not necessary to directly or indirectly attach all blocks to the reinforcement member. By way of example, every second layer or tier 3c may be formed of non-suspended blocks, only the intermediate layers need be attached since the immediately adjacent, inserted, non-attached layers will be held in place by the weight of the overlying portions of the blocks of the furnace wall. Where the walls of the furnace bulge inwards, a combination of conical and rectangular blocks is possible without disadvantage (see FIGURE 4). In inwardly convex furnace walls, the radius of curvature of the furnace wall and the associated wall reinforcement member may differ throughout the height of the furnace wall. The selection of a smaller radius of curvature for the upper portion of the furnace wall is of particular advantage because the separation or expansion joint between furnace wall and furnace dome can then be arranged parallel or substantially parallel.

A further advantage of the wall construction according to the present invention resides in the fact that the bifurcated lower end 11 of the reinforcement member 7 rests on a horizontally arranged support shaft 12 and can be horizontally shifted or displaced as well as laterally pivoted about the horizontal shaft axis. If the portions of the furnace adjacent to the movable furnace wall expand more markedly in the direction towards said movable wall, the latter may be suitably displaced on its lower support shaft.

An additional advantage of the wall construction pursuant to the present invention is that, should the end blocks or abutments 14 of the dome member 4 be laterally displaced to an extent greater than envisaged, as for example due to insufficient dimensioning of the expansion joints or undue increase in the volume of the blocks due to excessive gas absorption or infiltration, the dome will not be forced against a rigid furnace wall. Rather the furnace wall will be rotatably pushed outwards to a slight extent about its lower pivot support 12 so as to allow the necessary room for expansion of the blocks. The resistance to such pivotal movement offered by the furnace wall 3 is very slight in view of the existing and provided leverage conditions and it will not exert greater pressure on the blocks.

Having thus described the invention what is new and desired to be secured by United States Letters Patent is:

1. In a furnace or the like, a movable refractory brickwork furnace sidewall, a spaced dome member, said furnace sidewall and dome member having juxtaposed end walls forming an expansion joint containing a plane between said furnace sidewall and said dome member, reinforcement means movably supporting said furnace sidewall, means cooperating with the lower end portion of said reinforcement means permitting the latter to move at least vertically and pivotally about a pivot support to accommodate for thermal effects acting on said furnace sidewall, said cooperating means including support means defining said pivot support disposed adjacent one end portion of said reinforcement means, said one end portion of said reinforcement means being pivotally carried by said pivot support of said support means, said reinforcement means having a laterally extending guide member projecting from the upper end portion thereof, guide means having a guide surface disposed at least substantially parallel to said juxtaposed end walls and engaging said guide member to guide movement of said reinforcing means and the sidewall mounted thereby at least substantially parallel to the plane of said expansion joint.

2. In a furnace or the like according to claim 1, said support means and said reinforcement means including respectively first and second cooperating mounting element means, one of said mounting element means comprising an at least substantially horizontally disposed shaft and the other of said mounting element means comprising a bifurcated member on said shaft for pivotal, vertical and lateral movement with respect thereto, one of said mounting element means being carried on said lower end portion of said reinforcing means, whereby said reinforcing means and sidewall supported thereby are laterally, pivotally and vertically movable to accommodate for thermal effects acting on said sidewall.

3. In a furnace or the like as defined in claim 1, said reinforcement means including bracket means defining respective cooling passages between said bracket means and said furnace sidewall.

4. In combination with a furnace having a movable sidewall and a dome section having juxtaposed end walls forming an expansion joint containing a plane between said sidewall and said dome section, and support means mounted to said sidewall and having a laterally extending guide arm portion at the upper end thereof: means mounting the lower end of said support means for at least pivotal and vertical movement thereof while said end walls are in juxtaposed relation, and guide means having a guide surface disposed at least substantially parallel to said juxtaposed end walls and engaging said guide arm portion of said support means to guide movement of said support means and the sidewall carried thereby at least substantially parallel to the plane of said expansion joint.

5. The combination defined in claim 4 wherein said support means and said means mounting the lower end of said support means cooperate through an at least substantially horizontal support shaft forming part of one of said last mentioned means, and a bifurcated support element carried on said shaft forming part of the other of said last mentioned means whereby to permit pivotal, vertical and lateral movement of said support means while said end walls are in juxtaposition.

6. In a furnace or the like, as defined in claim 1, said pivot support comprising a substantially horizontal support shaft, said reinforcement means including an I-shaped member having web portions and flange portions with rib means carried by said web portions intermediate said flange portions, securing means for detachably suspending said refractory brickwork in spaced relation from said web portions of said reinforcement means to define therebetween cooling passages adapted to receive a medium for cooling said furnace sidewall, said rib means being provided at one end with a bifurcated portion adapted to be pivotably carried on said support shaft to permit said reinforcement means to carry out both pivotal and lateral movement with respect to the horizontal axis of said support shaft as well as lengthwise movement in the direction of the longitudinal axis of said reinforcement means, to accommodate for thermal effects acting on said furnace sidewall.

7. The combination defined in claim 5 wherein said bifurcated support element is fixed to the lower end of said support means.

8. In a furnace or the like according to claim 1, said reinforcement means and said furnace sidewall being horizontally shiftable and laterally pivotable on said support means with respect to a horizontal axis.

9. In a furnace or the like according to claim 1, said furnace sidewall consisting of individual refractory brickwork wall sections arranged in parallel relation and adjacent one another, said reinforcement means being individual reinforcement members each pivotably supporting an individual refractory brickwork wall section.

10. In a furnace or the like according to claim 1, said reinforcement means being composed of separate joined plate members, said refractory brickwork consisting of individual block members detachably carried by said separate joined members in overlying relationship to one another.

11. In a furnace or the like according to claim 10, wherein connecting members are provided for securing together said separate joined plate members, said individual block members being detachably carried by said connecting members in overlying relationship to one another.

12. In a furnace or the like according to claim 1, said refractory brickwork consisting of individual block members defining said furnace sidewall, securing means for attaching each of said individual block members to said reinforcement means.

13. In a furnace or the like according to claim 12, said securing means attaching alternate layers of individual block members to said reinforcement means.

14. In a furnace or the like according to claim 12, said individual block members being unbaked and formed of magnesite and chromite and provided with a sheet-metal jacket.

References Cited in the file of this patent

UNITED STATES PATENTS

| | | |
|---|---|---|
| 1,901,560 | Jacobus | Mar. 14, 1933 |
| 1,999,708 | Stowe | Apr. 30, 1935 |
| 2,476,423 | Longenecker | July 19, 1949 |
| 2,659,326 | Honig | Nov. 17, 1953 |
| 2,676,793 | Jones | Apr. 27, 1954 |
| 2,762,217 | Barr et al. | Sept. 11, 1956 |
| 2,930,601 | Heuer | Mar. 29, 1960 |

FOREIGN PATENTS

| | | |
|---|---|---|
| 176,864 | Austria | Dec. 10, 1953 |
| 180,069 | Austria | Nov. 10, 1954 |
| 1,182,625 | France | June 26, 1959 |